(12) United States Patent
Shida et al.

(10) Patent No.: US 12,583,402 B2
(45) Date of Patent: Mar. 24, 2026

(54) WIRE HARNESS AND WIRE HARNESS WITH BASE MEMBER

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Tomoka Shida, Osaka (JP); Satoshi Yamamoto, Osaka (JP); Masami Ono, Osaka (JP); Yuuta Inoue, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 171 days.

(21) Appl. No.: 18/571,240

(22) PCT Filed: Jun. 7, 2022

(86) PCT No.: PCT/JP2022/022959
§ 371 (c)(1),
(2) Date: Dec. 17, 2023

(87) PCT Pub. No.: WO2023/276581
PCT Pub. Date: Jan. 5, 2023

(65) Prior Publication Data
US 2024/0286562 A1 Aug. 29, 2024

(30) Foreign Application Priority Data
Jun. 28, 2021 (JP) ................................. 2021-106856

(51) Int. Cl.
*B60R 16/00* (2006.01)
*B60N 2/90* (2018.01)
(Continued)

(52) U.S. Cl.
CPC ............ *B60R 16/0215* (2013.01); *B60N 2/90* (2018.02); *B60R 16/03* (2013.01); *B60N 2230/00* (2023.08)

(58) Field of Classification Search
CPC ....... B60R 16/0215; B60R 16/03; B60N 2/90; B60N 2230/00
See application file for complete search history.

(56) References Cited

U.S. PATENT DOCUMENTS

| | | | | |
|---|---|---|---|---|
| 5,338,014 A | * | 8/1994 | Kitamura ......... | H01B 13/01209 269/317 |
| 6,011,318 A | * | 1/2000 | Mayoras ........... | B60N 2/0224 361/826 |
| 2020/0112130 A1 | * | 4/2020 | Watanabe ........... | H01R 13/50 |

FOREIGN PATENT DOCUMENTS

| JP | 2010-027242 A | 2/2010 |
|---|---|---|
| JP | 2012-051494 A | 3/2012 |

(Continued)

OTHER PUBLICATIONS

JP 2010027242A; English Translation; published in 2010 (Year: 2010).*

(Continued)

*Primary Examiner* — Pete T Lee
(74) *Attorney, Agent, or Firm* — Venjuris, P.C.

(57) ABSTRACT
The wire harness includes a base harness having a plurality of electric wires and a protective member. The plurality of electric wires branch into three or more branch lines inside the protective member, and are kept flat by the protective member. The three or more branch lines include a first branch line provided with a first connector for receiving (Continued)

power supply from an upstream side, a second branch line provided with a second connector for supplying power received by the first connector to a device provided in the seat, and a third branch line provided with a third connector for supplying the power received by the first connector to an optional device provided in the seat.

12 Claims, 12 Drawing Sheets

(51) Int. Cl.
 *B60R 16/02* (2006.01)
 *B60R 16/03* (2006.01)

(56) References Cited

FOREIGN PATENT DOCUMENTS

| | | |
|---|---|---|
| JP | 2015-110424 A | 6/2015 |
| JP | 2017-123746 A | 7/2017 |

OTHER PUBLICATIONS

JP 2012051494A; published in 2012 ;English Translation (Year: 2012).*
International Search Report issued on Aug. 16, 2022 for WO 2022/276581 A1 (4 pages).

* cited by examiner

WIRE HARNESS AND WIRE HARNESS WITH BASE MEMBER

CROSS REFERENCE TO RELATED APPLICATIONS

This application is a national phase of PCT application No. PCT/JP2022/022959, filed on 7 Jun. 2022, which claims priority from Japanese patent application No. 2021-106856, filed on 28 Jun. 2021, all of which are incorporated herein by reference.

TECHNICAL FIELD

The present disclosure relates to a wire harness and a wire harness with a base member.

BACKGROUND

Patent Document 1 discloses a wire harness that is to be attached to a seat of a vehicle. In the wire harness described in the patent document, terminal portions are bound together with adhesive tape.

PRIOR ART DOCUMENT

Patent Document

Patent Document 1: JP 2015-110424 A

SUMMARY OF THE INVENTION

Problems to be Solved

If there is a greater number of optional devices that the user can select in the seat of the vehicle, manufacturing and routing of the wire harness may become complicated.

In view of this, it is an object of the present invention to provide a technique for simplifying manufacturing and routing of a wire harness even when there is a greater number of optional devices that a user can select in the seat of the vehicle.

Means to Solve the Problem

The wire harness of the present disclosure is a wire harness to be attached to a seat of a vehicle, including a base harness including a plurality of electric wires and a protective member covering intermediate portions of the plurality of electric wires, in which the plurality of electric wires branch into three or more branch lines inside the protective member, and are kept flat by the protective member, and the three or more branch lines include a first branch line provided with a first connector for receiving power supply from an upstream side, a second branch line provided with a second connector for supplying power received by the first connector to a device provided in the seat, and a third branch line provided with a third connector for supplying power received by the first connector to an optional device provided in the seat.

Effect of the Invention

According to the present disclosure, even if there is a greater number of optional devices that can be selected by a user in a seat of a vehicle, manufacturing and routing of a wire harness can be simplified.

DETAILED DESCRIPTION TO EXECUTE THE INVENTION

Figure 1:
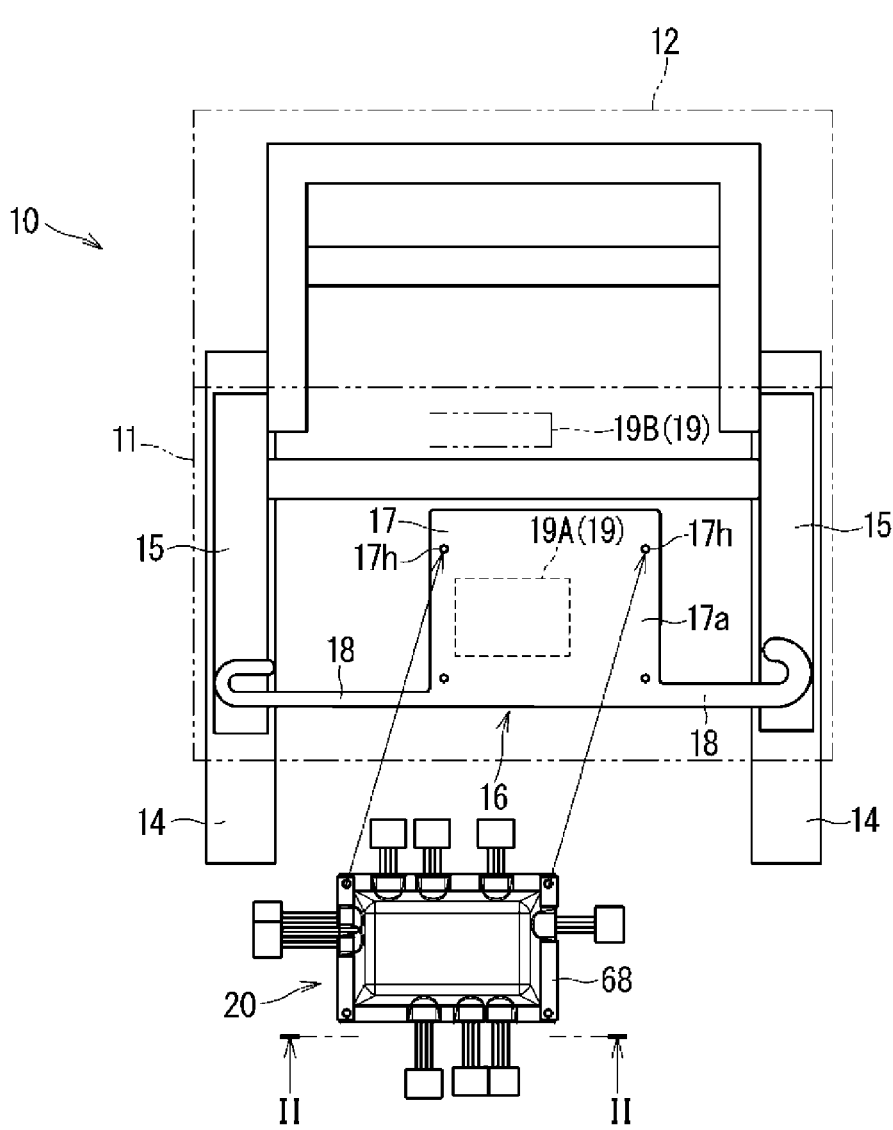
FIG. 1 is a schematic plan view showing a wire harness according to a first embodiment and a seat to which the wire harness is to be attached.

Description of Embodiments of the Present Disclosure

First, embodiments of the present disclosure will be listed and described.

The wire harness of the present disclosure is as follows.

(1) A wire harness to be attached to a seat of a vehicle, including a base harness including a plurality of electric wires and a protective member covering intermediate portions of the plurality of electric wires, in which the plurality of electric wires branch into three or more branch lines inside the protective member, and are kept flat by the protective member, and the three or more branch lines include a first branch line provided with a first connector for receiving power supply from an upstream side, a second branch line provided with a second connector for supplying power received by the first connector to a device provided in the seat, and a third branch line provided with a third connector for supplying power received by the first connector to an optional device provided in the seat. Due to the wire harness for supplying power to the optional device including the third connector, when the optional device is mounted, power can be supplied to the optional device via the third connector and the optional harness connected to the third connector. Also, when no optional device is mounted, the optional harness is omitted, whereby it is possible to suppress an increase in the weight of the vehicle. In the wire harness, since the portion where the protective member is provided is kept flat, a space for arranging the optional harness can be created above the protective member or the like.

(2) In the wire harness according to (1), the wire harness may further include an optional harness for the optional device, and an intermediate portion of the optional harness may overlap the protective member and a connector at an end of the optional harness may be connected to the third connector. This prevents the arrangement space from increasing even when the optional harness is provided.

(3) In the wire harness according to (2), the intermediate portion of the optional harness may be formed flat by an optional protective member, and the protective member and the optional protective member may overlap with each other. This prevents the arrangement space from increasing even when the optional harness is provided.

(4) In the wire harness according to (3), a plurality of through holes for fixing to a base member may be formed in the protective member, a plurality of optional through holes for fixing to the base member may be formed in the optional protective member, and positions of the plurality of through holes and positions of the plurality of optional through holes may be aligned with each other. As a result, the protective member and the optional protective member can be fixed at a common position on the base member.

(5) In the wire harness according to any one of (2) to (4), the optional harness may include a first optional harness to be connected to the third connector and a second optional harness to be connected to the first optional harness. As a result, a plurality of optional devices can be divided into groups, and only the optional harness corresponding to the group of optional devices mounted in the vehicle can be mounted in the vehicle.

(6) Also, a wire harness with a base member according to the present disclosure includes: the wire harness of any one of (1) to (5); and a base member to be attached to the seat, in which the protective member is attached to the base member. As a result, since the protective member is attached to the base member, the intermediate portion of the wire harness can be placed along a predetermined path on the seat by attaching the base member to the seat.

Details of Embodiments of the Present Disclosure

Specific examples of the wire harness of the present disclosure will be described below with reference to the drawings. Note that the present disclosure is not limited to these examples, but is indicated by the scope of the claims, and all changes within the meaning and scope equivalent to the scope of the claims are intended to be encompassed therein.

First Embodiment

Hereinafter, a wire harness according to a first embodiment will be described.

First, a seat to which a wire harness is to be attached will be described with reference to FIG. 1. FIG. 1 is a schematic plan view showing a wire harness 20 according to a first embodiment and a seat 10 to which the wire harness 20 is to be attached.

The seat 10 typically has a seat portion 11 and a backrest portion 12 rotatably connected to the seat portion 11. The seat 10 is slidably attached to the vehicle body, for example, via a frame 13 provided below the seat portion 11. The frame 13 includes a pair of rails 14, a pair of sliders 15, and a base member 16. The pair of rails 14 are fixed to a floor portion of the vehicle body. The pair of rails 14 typically extend in a front-rear direction of the vehicle and are spaced apart from each other in a left-right direction of the vehicle. A slider 15 is attached to each rail 14. The sliders 15 are connected to the rails 14 so as to be slidable along the direction in which the rails 14 extend. The seat 10 is fixed to the sliders 15 or the like and moves integrally with the sliders 15. This allows the seat 10 to be slidable relative to the vehicle body in the front-rear direction of the vehicle.

The base member 16 extends in the direction in which the pair of sliders 15 are arranged side by side. The base member 16 is slidable with respect to the rails 14 together with the sliders 15. The base member 16 connects the pair of sliders 15. The base member 16 of the present disclosure supports the wire harness 20. The base member 16 may also support a device 19 to which the wire harness 20 is connected. Such a device 19 may be, for example, a motor or an ECU (electronic control unit). The base member 16 may be made of metal or resin. The base member 16 is preferably a rigid member. This allows the base member 16 to firmly support the wire harness 20 and the like.

In the example shown in FIG. 1, the base member 16 has a main body portion 17 and a pair of arm portions 18. The main body portion 17 is arranged between the pair of sliders 15. The main body portion 17 is arranged in the space below the seat portion 11 of the seat 10 (the space between the seat portion 11 and the floor portion of the vehicle body). The pair of arm portions 18 extend from the main body portion 17 to both sides. The leading end of each arm 18 is fixed to a corresponding slider 15.

The main body portion 17 has a support surface 17a. A protective member 40 of the wire harness 20 is supported on the support surface 17a. In the example shown in FIG. 1, the upper surface of the main body portion 17 is the support surface 17a. The lower surface of the main body portion 17 may also serve as the support surface 17a. In the example shown in FIG. 1, the support surface 17a is a flat surface. The support surface 17a may also have an inclined surface. The support surface 17a may also have a plurality of flat surfaces having different heights. The plurality of flat surfaces may be connected by an inclined surface. Also, in the example shown in FIG. 1, the support surface 17a has a rectangular shape in a plan view. The support surface 17a may also have a shape other than a rectangular shape in a plan view.

An attached portion for attaching the wire harness 20 may also be provided on the support surface 17a. In the example shown in FIG. 1, attachment holes 17h are provided as the attached portions. The attached portions may be provided at multiple locations. The wire harness 20 is attached to the base member 16 in a predetermined orientation by respectively attaching a plurality of locations of the wire harness 20 to the plurality of attached portions. In the example shown in FIG. 1, an attached portion is provided at each of the four corners of the rectangular support surface 17a.

Figure 2:
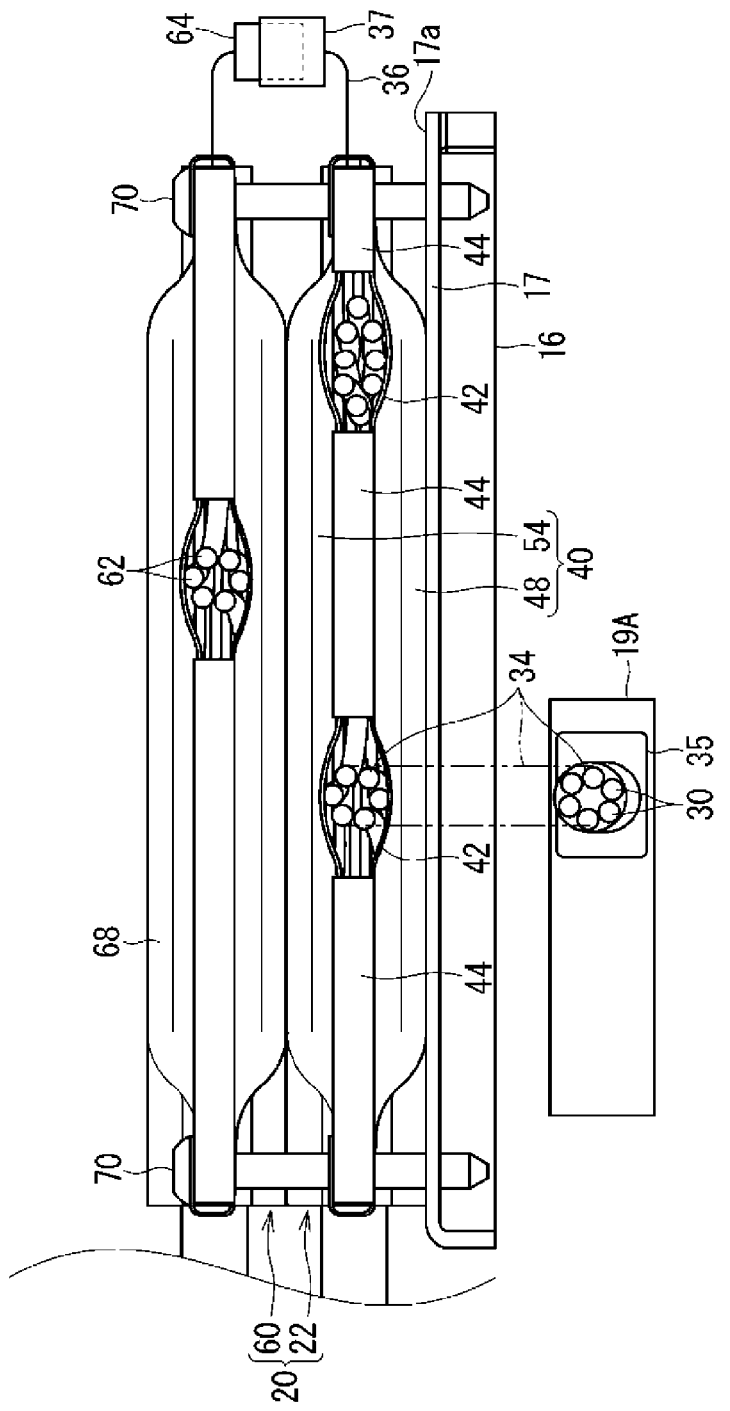
FIG. 2 is a schematic cross-sectional view taken along line II-II in FIG. 1.
Figure 3:
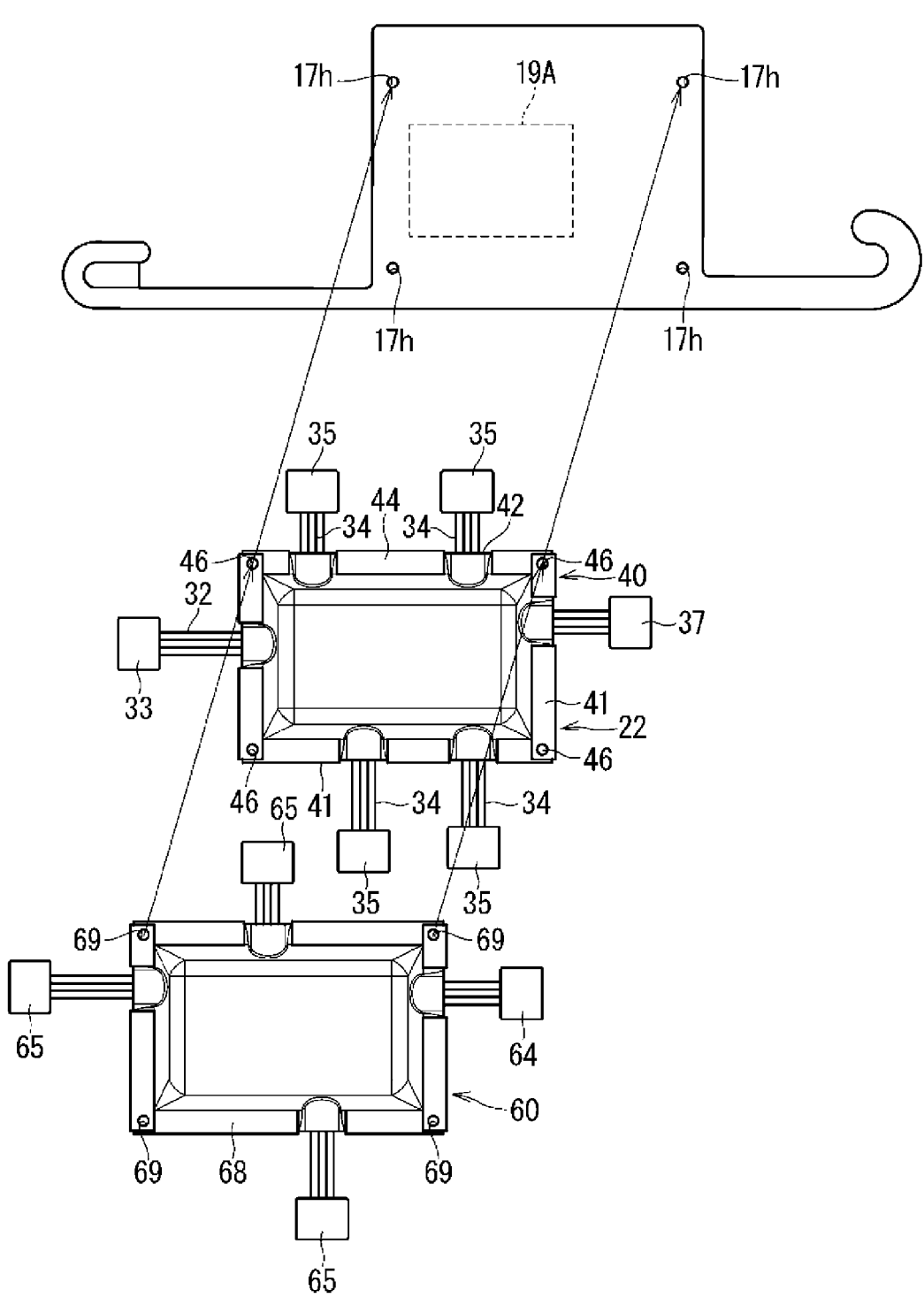
FIG. 3 is an exploded plan view of the wire harness according to the first embodiment.
Figure 4:
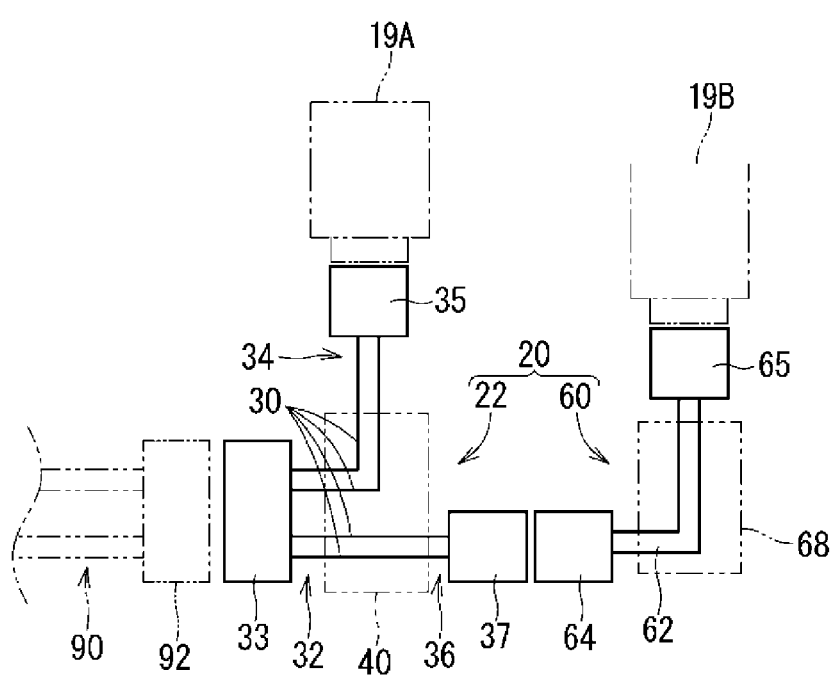
FIG. 4 is a schematic block diagram showing a circuit configuration of the wire harness.

The wire harness 20 will be described with reference to FIG. 1 as well as FIGS. 2 to 4. FIG. 2 is a schematic cross-sectional view taken along line II-II in FIG. 1. In FIG. 2, the wire harness 20 is shown attached to the base member 16. FIG. 3 is an exploded plan view of the wire harness according to the first embodiment. FIG. 4 is a schematic block diagram showing the circuit configuration of the wire harness.

The wire harness 20 is connected to the devices 19 associated with the seat 10. These devices 19 are set as appropriate depending on the vehicle type, grade, options, and the like. As examples of the devices 19, an air bag, a belt reminder, a seating sensor, an ECU, an electric seat motor, a heater, a ventilator, a massager, a biological sensor, a speaker, a microphone, a USB port, and the like are envisioned.

The devices 19 may also be divided into common devices 19A and optional devices 19B. The common devices 19A are devices that are highly related to vehicle driving safety or devices that are in high demand. The common devices 19A are assumed to be, for example, an airbag, a belt reminder, a seating sensor, an ECU, and the like. The optional devices 19B are devices that have little relevance to vehicle driving safety or devices that are not in high demand. The optional devices 19B are assumed to be, for example, a motor for an electric seat, a heater, a ventilator, a massager, a biological sensor, a speaker, a microphone, a USB port, and the like.

The devices 19 are arranged at positions on the seat 10 according to their functions. Some of the devices 19 may also be supported by the base member 16. The wire harness 20 supplies power to these devices 19 and sends signals between these devices 19 and external devices. The base harness 22 includes a base harness 22 and an optional harness 60. The base harness 22 supplies power to the common devices 19A. The optional harness 60 supplies power to the optional devices 19B. Power for the optional harness 60 is supplied from the base harness 22. The base harness 22 includes a plurality of electric wires 30 and a protective member 40.

Each electric wire 30 is a covered electric wire. A covered electric wire has a core wire and a covering that covers the core wire. Each electric wire 30 is a single-core electric wire with one conductive path. As the electric wires 30, multi-core electric wires having a plurality of conductive paths may also be used. The multi-core electric wires may also have a configuration in which a plurality of core wires are covered with a common covering. The multi-core electric wires may also have a configuration including a plurality of covered electric wires and a sheath that covers the plurality of covered electric wires. Connectors are provided at the ends of the electric wires 30. The electric wires 30 include power lines that supply power to the devices 19. The electric wires 30 may also include signal lines for transmitting signals between the devices 19 and an external device.

The intermediate portions of the plurality of electric wires 30 are covered by the protective member 40. The plurality of electric wires 30 branch into three or more branch lines 32, 34, and 36 inside the protective member 40. The plurality of electric wires 30 are kept flat by the protective member 40. The three or more branch lines 32, 34, and 36 include a first branch line 32, a second branch line 34, and a third branch line 36.

The first branch line 32 is provided with a first connector 33. The first connector 33 is a connector for receiving power supply from the upstream side. As shown in FIG. 4, the first connector 33 is connected to a partner-side connector 92 of an upstream partner-side wire harness 90. The wire harness 20 is connected to a battery or the like via a partner-side wire harness 90. There may be one or more first branch lines 32 and one or more first connectors 33.

The second branch line 34 is provided with a second connector 35. The second connector 35 is a connector for supplying the power received by the first connector 33 to the common devices 19A provided in the seat 10. As shown in FIG. 4, the second connector 35 is connected to the common devices 19A. There may be one or more second branch lines 34 and one or more second connectors 35. The numbers of the second branch lines 34 and second connectors 35 is set according to the number of the common devices 19A.

The third branch line 36 is provided with a third connector 37. The third connector 37 is a connector for supplying the power received by the first connector 33 to the optional devices 19B provided in the seat 10. There may be one or more third branch lines 36 and one or more third connectors 37.

All of the three or more branch lines 32, 34, and 36 extend to the outside from the outer edge 41 of the protective member 40. It is preferable that at least the second branch line 34 extends to the outside from the outer edge 41 of the protective member 40. The first branch line 32 may extend to the outside from the outer edge 41 of the protective member 40, or the first connector 33 may be located at the outer edge of the protective member 40. The third branch line 36 may extend to the outside from the outer edge 41 of the protective member 40, or the third connector 37 may be located at the outer edge 41 of the protective member 40.

The protective member 40 keeps the plurality of electric wires 30 in a flat state. The protective member 40 includes a first sheet member 48 and a second sheet member 54. The first sheet member 48 and the second sheet member 54 sandwich the intermediate portions of the plurality of electric wires 30. In this example, the first sheet member 48 and the second sheet member 54 are formed as separate members and then are combined together. For example, each of the first sheet member 48 and the second sheet member 54 can be formed by punching out a large sheet material, or the like.

There is no particular limitation on the structures of the sheet material forming the first sheet member 48 and the sheet material forming the second sheet member 54. For example, the sheet material may also be a fibrous sheet such as a knitted fabric, a woven fabric, or a nonwoven fabric. Also, for example, the sheet material may be a foam sheet or the like. Also, for example, the sheet material may be a sheet (also called a non-foamed sheet, a solid sheet, etc.) having a uniform solid cross section. The material of the sheet material is not particularly limited and can be set as appropriate. For example, the material of the sheet material may be a resin such as a thermoplastic resin or a thermosetting resin. The type of such resin is not particularly limited, and may be polyethylene terephthalate (PET), polyvinyl chloride (PVC), polyethylene (PE), polypropylene (PP), or the like. If the first sheet member 48 and the second sheet member 54 are separate members, the first sheet member 48 and the second sheet member 54 may be made of the same material and have the same structure, or may be made of different materials and have different structures.

The portions where the branch lines 32, 34, and 36 extend outside the protective member 40 at the outer edge 41 of the protective member 40 are defined as extension ports 42. Three or more extension ports 42 are provided on the outer edge 41 of the protective member 40. Fixing portions 44 are provided adjacent to the extension ports 42 on the outer edge 41 of the protective member 40. At the fixing portions 44, the first sheet member 48 and the second sheet member 54 are fixed to each other. The fixing portions 44 are provided on both sides of one extension port 42. The extension ports 42 are partitioned by the fixing portions 44. The first sheet member 48 and the second sheet member 54 sandwich the electric wires 30 at the extension ports 42. The first sheet member 48 and the second sheet member 54 may or may not be in contact with each other at the fixing portions 44.

In the example shown in FIG. 3, the plurality of electric wires 30 are branched into seven branch lines 32, 34, and 36 inside the protective member 40. The seven branch lines 32, 34, and 36 extend out of the protective member 40 from different portions of the outer edge 41. Seven extension ports 42 are provided on the outer edge 41 of the protective member 40.

The shape of the outer edge 41 of the protective member 40 is not particularly limited, and can be set as appropriate. For example, the outer edge 41 of the protective member 40 may have a rectangular shape, a polygonal shape, a rectangular shape with a notch formed in a portion thereof, or the like. The shape of the outer edge 41 of the protective member 40 may also be a shape corresponding to the support surface 17a. In the example shown in FIG. 2, the protective member 40 is formed in a rectangular shape.

The positions of the plurality of extension ports 42 in the protective member 40 are not particularly limited, and can be set as appropriate. In the example shown in FIG. 2, the extension ports 42 are provided on all four sides of the protective member 40. In the protective member 40, the extension ports 42 may be provided on all sides. In the protective member 40, there may be a side where no extension port 42 is provided. In the extension ports 42, the branch lines 32, 34, and 36 and the protective member 40 may or may not be fixed to each other.

The fixing portions 44 of the present disclosure are folded fixing portions 44. The folded fixing portions 44 are portions where one of the first sheet member 48 and the second sheet member 54 is folded back and fixed so as to overlap with the outer surface of the other sheet member. The fixing mode of the first sheet member 48 and the second sheet member 54 in the folded fixing portion 44 is not particularly limited, and adhesion, fusion, or the like may be set as appropriate. Such a fixing mode is preferably one in which the first sheet member 48 and the second sheet member 54 do not need to be strongly pressed from both sides, and for example, adhesion using an adhesive, double-sided adhesive tape, or the like is preferable. As a result, even if the first sheet member 48 and the second sheet member 54 are pressed from both sides with the electric wires 30 caught between them, the electric wires 30 are less likely to be damaged.

Through holes 46 for fixing the protective member 40 to the base member 16 are formed in the protective member 40. The through holes 46 are formed at positions corresponding to the attachment holes 17h. The protective member 40 is formed in a shape that allows the through holes 46 to be placed at positions corresponding to the attachment holes 17h.

The through holes 46 are formed at positions where the first sheet member 48 and the second sheet member 54 overlap. The through holes 46 pass through both the first sheet member 48 and the second sheet member 54. This strengthens the through holes 46. Even if the protective member 40 is pulled when fixing one of the plurality of through holes 46 and then fixing another, the periphery of the through hole 46 is less likely to be torn.

The through holes 46 are preferably provided in the fixing portions 44. This prevents the first sheet member 48 and the second sheet member 54 from moving apart from each other at the positions of the through holes 46, and thus it is easier to insert pins 70 or the like into the through holes 46.

The through holes 46 are preferably provided in the folded fixing portions 44. It is preferable that the folded fixing portions 44 are provided at the positions where the through holes 46 are formed. As a result, the first sheet member 48 and the second sheet member 54 overlap in three or more layers at the positions of the through holes 46, and the through holes 46 are further strengthened. In this example, the through holes 46 are provided in the folded fixing portions 44 at which the first sheet member 48 and the second sheet member 54 overlap in four layers.

It is preferable that holes corresponding to the through holes 46 are formed in the first sheet member 48 and the second sheet member 54 before being fixed to each other. As a result, the holes corresponding to the through holes 46 can also be used as holes through which jigs are passed when manufacturing the wire harness 20.

The protective member 40 is flat. The space below the seat portion 11 is narrow in the height direction. Since the protective member 40 is flat, the protective member 40 can be easily accommodated in the space below the seat portion 11.

In a region inside the outer edge 41 of the protective member 40, the first sheet member 48 and the second sheet member 54 are not fixed to each other and are in a free state. The inner surface of the first sheet member 48 facing toward the electric wires 30 and the inner surface of the second sheet member 54 facing toward the electric wires 30 are not fixed to each other and are in a free state.

In a region inside the outer edge 41 of the protective member 40, the plurality of electric wires 30 are not bundled together and extend apart from each other. Also, in a region inside the outer edge 41 of the protective member 40, the plurality of electric wires 30 are not fixed to the first sheet member 48 and the second sheet member 54, and extend along free paths. In a region inside the outer edge 41 of the protective member 40, each electric wire 30 is not restrained by any of the other electric wires 30, the first sheet member 48, and the second sheet member 54.

One end of an electric wire 30 extends out from one extension port 42, and the other end extends out from another extension port 42. The electric wires 30 extend between two predetermined extension ports 42 for each electric wire 30 inside the protective member 40. The electric wires 30 extend between the two extension ports 42 along paths longer than the shortest path. The shortest path is a path along a straight line connecting the two extension ports 42. The electric wires 30 extend in a curved manner between the two extension ports 42. As a result, the extra lengths of the electric wires can be stored inside the protective member 40.

The optional harness 60 includes a plurality of optional electric wires 62 (hereinafter simply referred to as electric wires 62) and an optional protective member 68 (hereinafter simply referred to as a protective member 68).

The electric wires 62 include power lines that supply power to the optional devices 19B. The electric wires 62 may also include signal lines for transmitting signals between the optional devices 19B and an external device. The configurations described for the electric wires 30 above can be applied to the electric wires 62 as long as they do not contradict each other. For example, the electric wires 62 may be covered electric wires like the electric wires 30 described above. An optional first connector 64 (hereinafter simply referred to as the first connector 64) and an optional second connector 65 (hereinafter simply referred to as the second connector 65) are provided at the ends of the electric wires 62. The first connector 64 is connected to the third connector 37. The second connector 65 is connected to the optional devices 19B.

The protective member 68 covers the intermediate portions of the electric wires 62. The configurations described for the protective member 40 above can be applied to the protective member 68 as long as they do not contradict each other. For example, the protective member 68 may be constituted by two sheet members, similarly to the protective member 40 described above.

An intermediate portion of the optional harness 60 overlaps the protective member 40. Here, the intermediate portion of the optional harness 60 is formed flat by the protective member 68. The protective member 40 and the protective member 68 overlap with each other.

A plurality of optional through holes 69 (hereinafter simply referred to as through holes 69) are formed in the protective member 68. The through holes 69 are holes for fixing to the base member 16. The positions of the plurality of through holes 46 and the positions of the plurality of through holes 69 are aligned.

[Manufacturing Method]

FIGS. 5 to 8 are explanatory diagrams showing how the base harness 22 is manufactured. Note that FIGS. 5 to 8 are all plan views.

Figure 5:
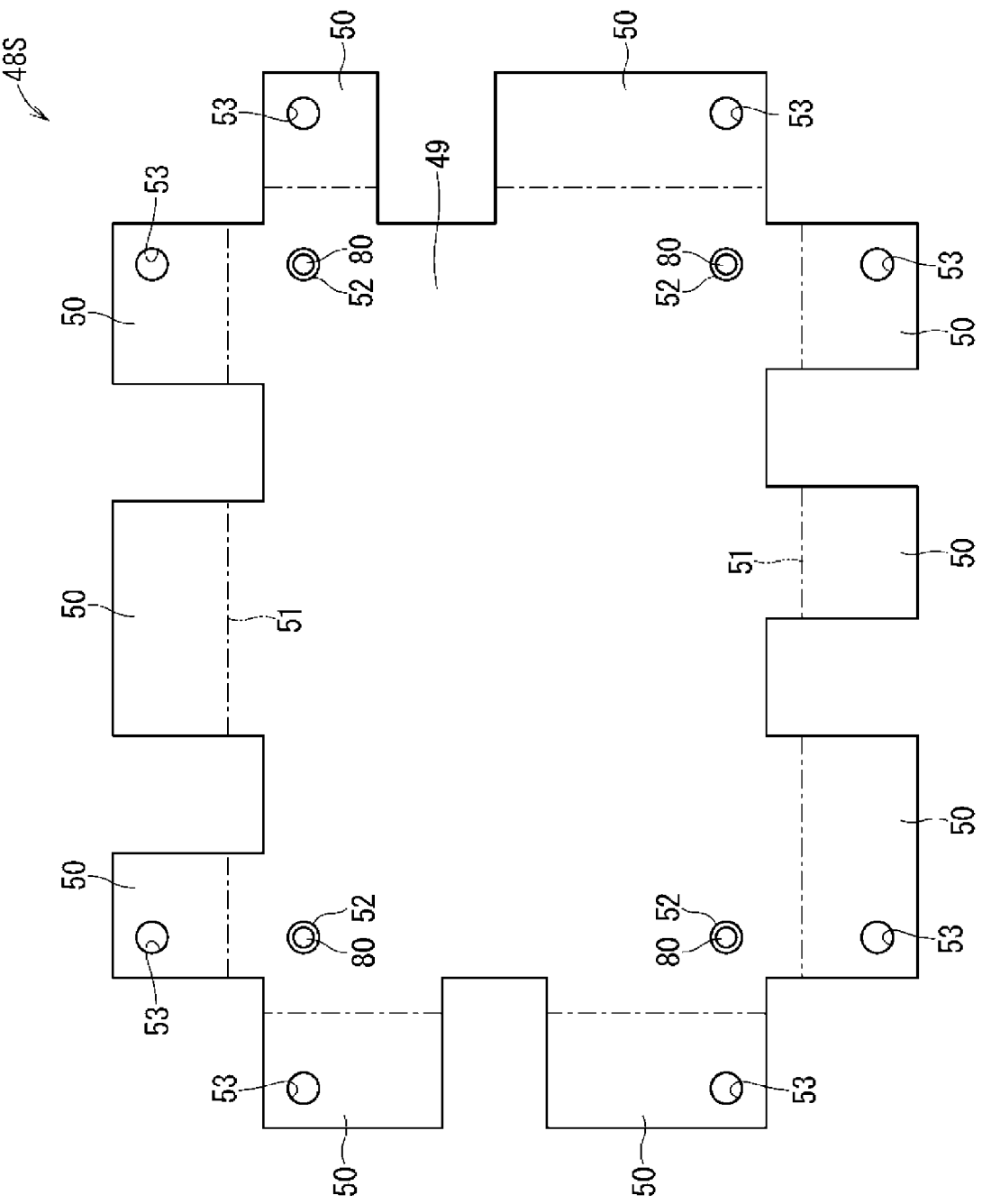
FIG. 5 is an explanatory diagram showing how a base harness is manufactured.

First, the first sheet member 48 and the second sheet member 54 that have not yet been combined with each other are prepared. Hereinafter, the first sheet member 48 and the second sheet member 54 that have not yet been combined with each other are denoted by a reference sign S in some cases. FIG. 5 shows a first sheet member 48S that has not yet been combined with the second sheet member 54. The first sheet member 48S is formed into a flat sheet shape. The first sheet member 48S has a first main body portion 49 and a plurality of first protruding portions 50. The first main body portion 49 is a portion forming the main body of the protective member 40. Each first protruding portion 50 protrudes outward from the outer edge of the first main body portion 49. Each first protruding portion 50 is a portion that is to be a folded fixing portion 44. Four first through holes 52 are formed in the first main body portion 49. First through holes 53 are also formed in some of the first protruding portions 50. The first through holes 52 of the first main body portion 49 and the first through holes 53 of the first protruding portions 50 overlap with each other when the first protruding portions 50 are folded back with predetermined folds 51. In FIG. 5, the fold 51 in each first protruding portion 50 is indicated by a dashed dotted line.

This first sheet member 48S is held by jigs 80, as shown in FIG. 5. By inserting pin-shaped jigs 80 into the four first through holes 52 of the first main body portion 49, the first sheet member 48S is held by the jigs 80.

Figure 6:
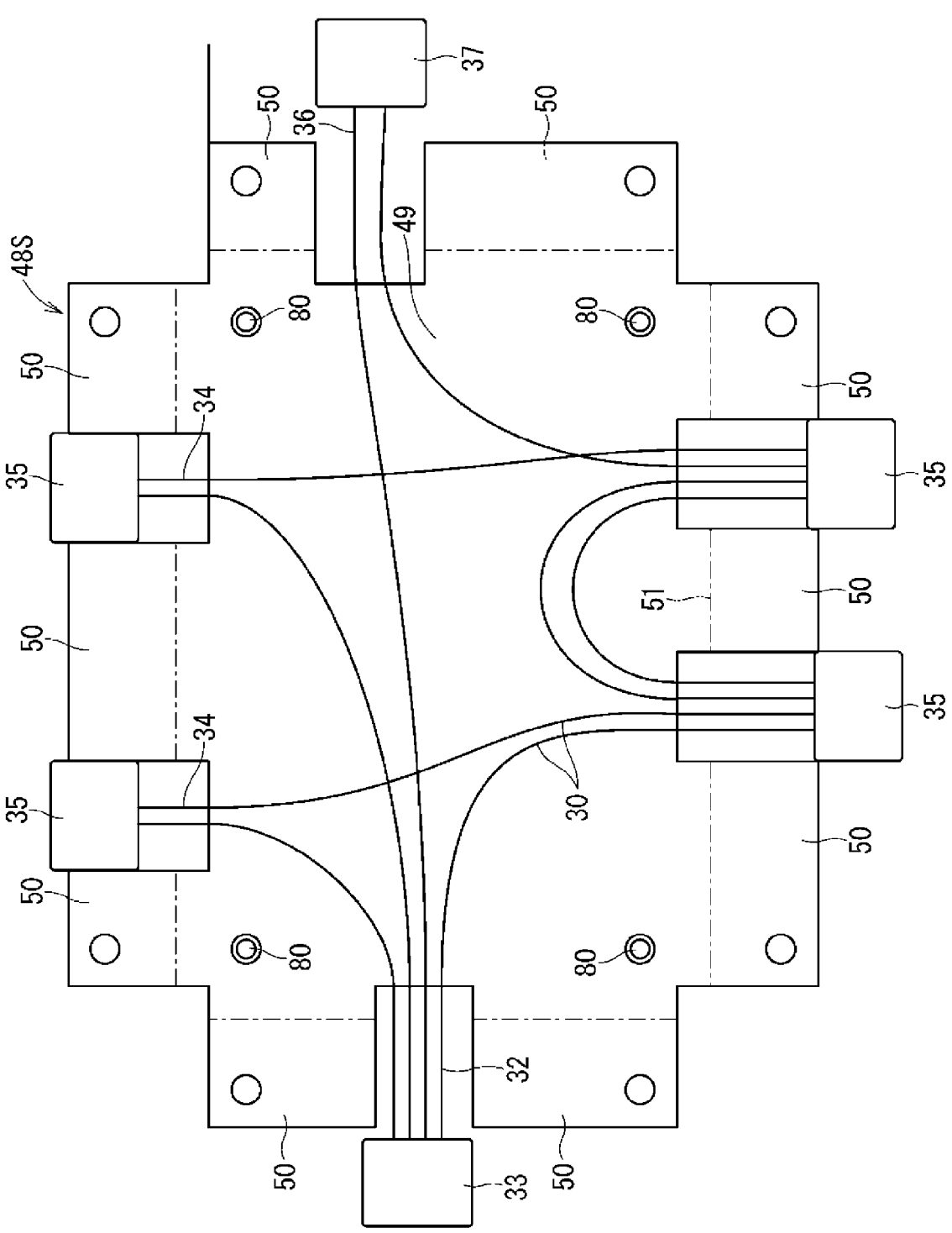
FIG. 6 is an explanatory diagram showing how the base harness is manufactured.

Next, as shown in FIG. 6, the intermediate portions of the plurality of electric wires 30 are arranged on the first sheet member 48. At this time, by arranging the plurality of electric wires 30 according to a predetermined wiring mode, the plurality of branch lines 32, 34, and 36 extend from predetermined positions on the outer edge of the first main body portion 49 (here, between the first protruding portions 50). For example, by holding the connectors 33, 35, and 37 at the ends of the plurality of electric wires 30 at predetermined positions, the plurality of electric wires 30 can be arranged according to a predetermined wiring mode.

Figure 7:
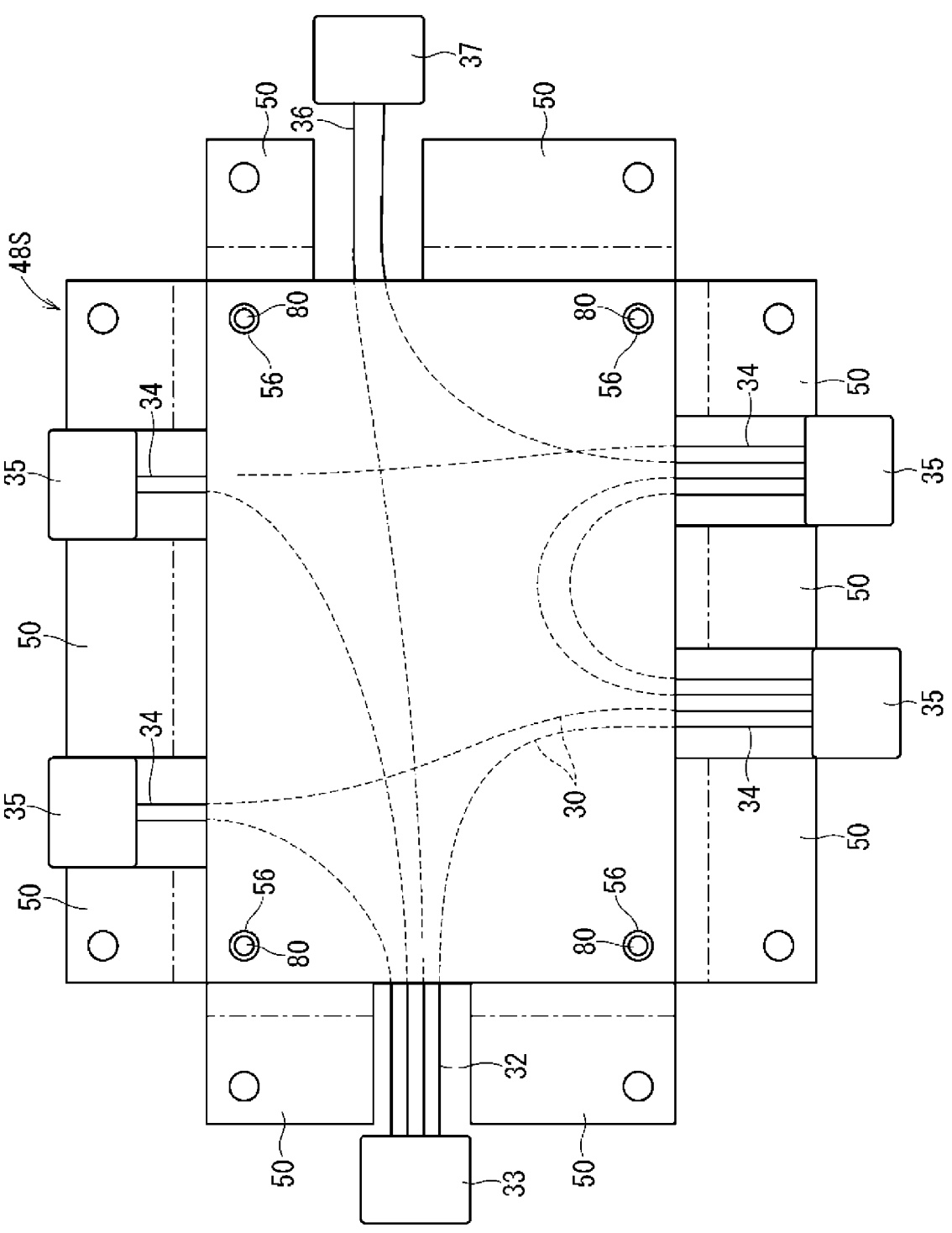
FIG. 7 is an explanatory diagram showing how the base harness is manufactured.

Next, as shown in FIG. 7, a second sheet member 54S is overlaid on the first sheet member 48S and the electric wires 30. FIG. 7 shows the second sheet member 54S that has not yet been combined with the first sheet member 48S. The second sheet member 54S has a second main body portion 55. The second main body portion 55 is a portion forming the main body of the protective member 40. The second main body portion 55 is formed in a shape corresponding to the first main body portion 49. Four second through holes 56 are formed in the second main body portion 55. By inserting the pin-shaped jigs 80 into the four second through holes 56, a state is maintained in which the second sheet member 54S is held by the jigs 80 and is arranged on the first sheet member 48S and the electrical wires 30.

Figure 8:
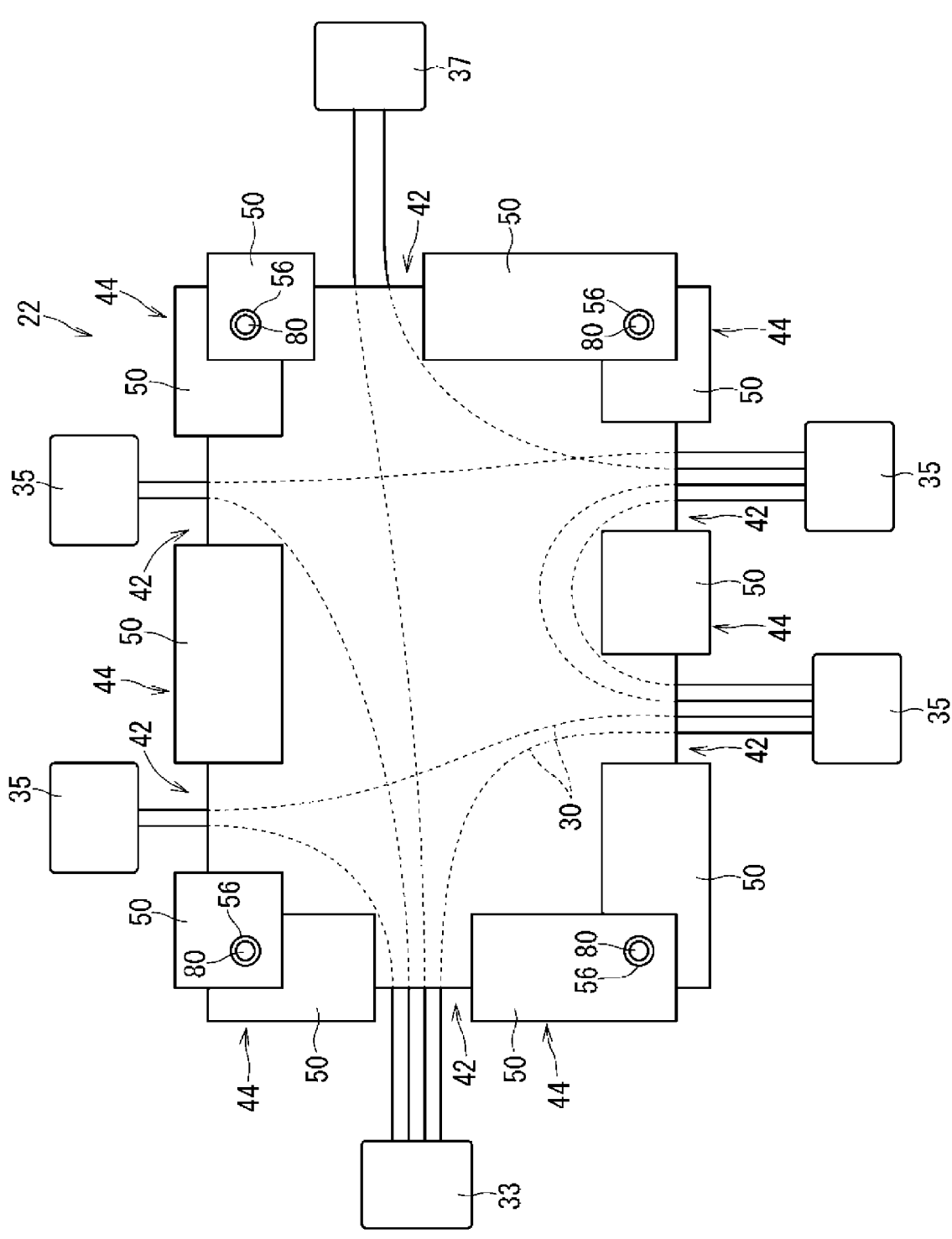
FIG. 8 is an explanatory diagram showing how the base harness is manufactured.

Next, as shown in FIG. 8, the first protruding portions 50 are folded back and are overlaid on the outer surface of the second sheet member 54. For the first protruding portions 50 in which the first through holes 52 are formed, the jigs 80 are inserted into the first through holes 52. Then, the first protruding portions 50 and the second sheet member 54 are fixed with adhesive or the like. As a result, the folded fixing portions 44 are formed. By forming the folded fixing portions 44, the extension ports 42 are formed between the folded fixing portions 44.

It is preferable that the first sheet member 48 and the second sheet member 54 have enough flexibility to bend along the branch lines 32 toward the fixing portions 44 adjacent thereto while sandwiching the electric wires 30 at the extension ports 42. As a result, the extension ports 42 become smaller and the branch lines 32 becomes less likely to move unintendedly. Also, a three-dimensional protective member 40 corresponding to the electric wires 30 can be formed using the flat first sheet member 48S and the second sheet member 54S.

When the jigs 80 are removed, the holes into which the jigs 80 were inserted appear as the through holes 46 in the protective member 40. As described above, the protective member 40 is attached to the plurality of electric wires 30, and the base harness 22 is manufactured. Similarly to the base harness 22, the optional harness 60 can also be formed using two sheet members.

<Method for Attaching Base Member>

Next, a mode for attaching the wire harness 20 to the base member 16 will be described. In this example, the wire harness 20 is attached to the base member 16 using pins 70. In this example, the base member 16, the protective member 40, and the protective member 68 overlap in this order. The order of arrangement of the protective member 40 and the protective member 68 may also be reversed.

The protective member 40 is placed on a support surface 17a of the base member 16. The protective member 68 is placed on the protective member 40. The pins 70 pass through the through holes 46 of the protective member 40 and the through holes 69 of the protective member 68 and lock into the attachment holes 17h of the base member 16. At this time, the devices 19 may be attached to the base member 16, and the connectors at the ends of the wire harness 20 may be connected to the devices 19. In the example shown in FIG. 2, the devices 19A are provided on the surface of the base member 16 opposite to the support surface 17a. The connectors 35 of the second branch lines 34 are then connected to the devices 19A.

Note that the attached portions of the base member 16 do not need to be the attachment holes 17h, and may be, for example, stud bolts or the like. In this case, the wire harness 20 is attached to the base member 16 by passing the stud bolts through the through holes 46 of the protective member 40 and the through holes 69 of the protective member 68.

When the attachment to the base member 16 is complete, the protective member 40 of the wire harness 20 and the protective member 68 are attached at a predetermined position. Thereafter, the branch lines 32, 34, and 36 extending from the protective member 40 and the branch lines 62 extending from the protective member 68 are routed to the position of the connection partner, thereby completing the routing of the wire harness 20.

In the example shown in FIG. 1, the wire harness 20 is shown attached to the base member 16 provided on the seat 10. The wire harness 20 may also be attached to the base member 16 before being installed on the seat 10. In this case, the wire harness 20 with base member 16 includes the wire harness 20 and the base member 16. By attaching the base member 16 of the wire harness 20 with the base member 16 to the seat 10, the step of attaching the base member 16 to the seat 10 and the step of attaching the wire harness 20 can be performed in a common step. The wire harness 20 with the base member 16 may further include the devices 19 attached to the base member 16, and the connectors of the wire harness 20 may be connected to the devices 19.

Effects, Etc.

According to the wire harness 20 configured as described above and the wire harness 20 with the base member 16 including the same, due to the wire harness 20 including the third connector 37 for supplying power to the optional devices 19B, when the optional devices 19B are mounted, power can be supplied to the optional devices 19B via the third connector 37 and the optional harness 60 connected thereto. As a result, the optional harness 60 can be provided according to the optional devices 19B. Since the portion of the wire harness 20 where the protective member 40 is provided is kept flat, a space for arranging the optional harness 60 can be created above the protective member 40 or the like.

Also, the wire harness 20 further includes an optional harness 60 for the optional devices 19B, and the intermediate portion of the optional harness 60 overlaps the protective member 40, and the connector 64 at the end is connected to the third connector 37. This prevents the arrangement space from increasing even when the optional harness 60 is provided.

Also, the intermediate portion of the optional harness 60 is formed flat by the protective member 68, and the protective member 40 and the protective member 68 overlap. This prevents the arrangement space from increasing even when the optional harness 60 is provided.

Also, the positions of the plurality of through holes 46 in the protective member 40 and the positions of the plurality of through holes 69 in the protective member 68 are aligned with each other. As a result, the protective member 40 and the protective member 68 can be fixed at a common position on the base member 16.

Also, according to the wire harness 20 with the base member 16, since the protective member 40 is attached to the base member 16, the intermediate portion of the wire harness 20 can be arranged along a predetermined path on the seat 10 by attaching the base member 16 to the seat 10.

[Supplementary Notes]

Figure 9:
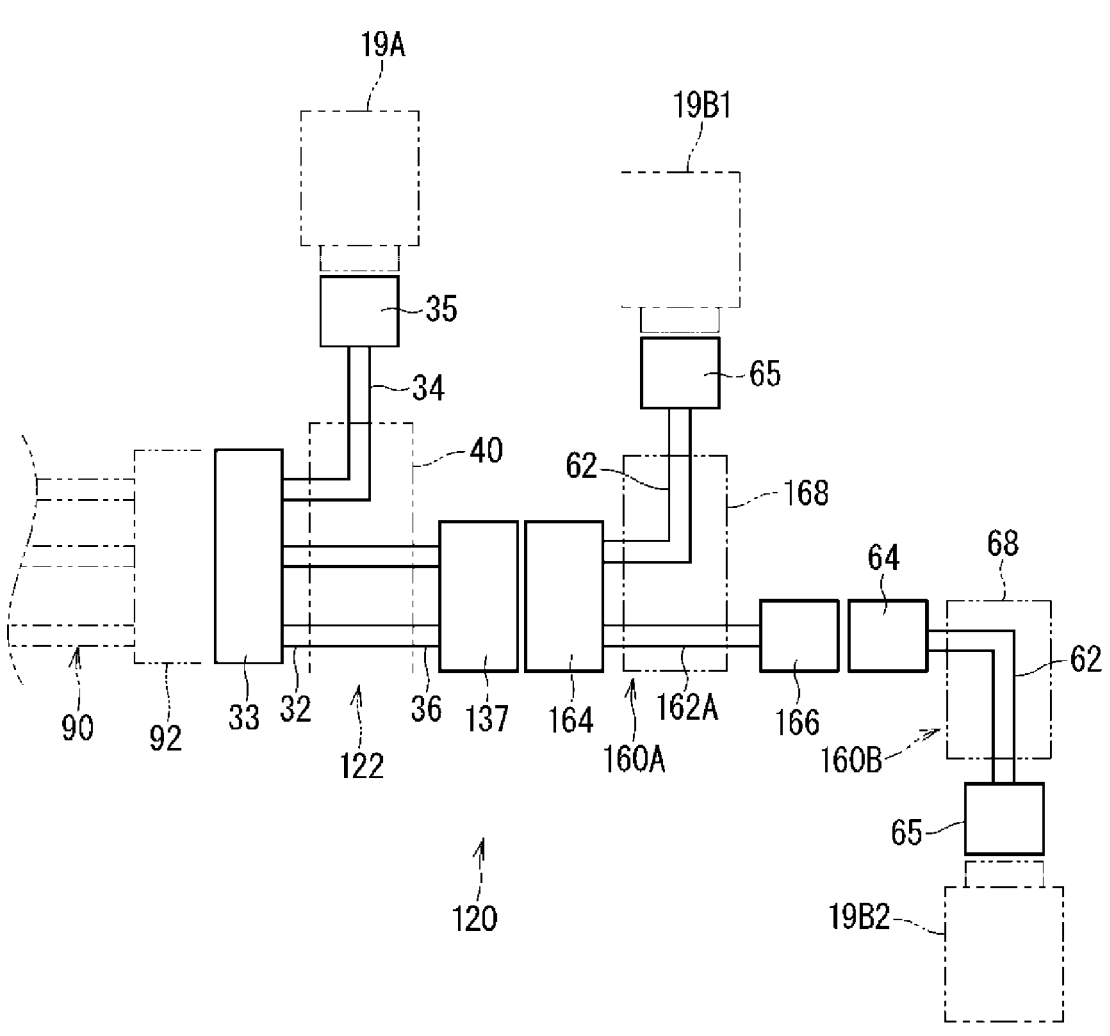
FIG. 9 is a schematic block diagram showing a modified example of a circuit configuration of the wire harness.

FIG. 9 is a block diagram showing a modified example of the circuit configuration of the wire harness 20.

Although the wiring harness 20 has been described thus far as including one optional harness 60, this is not an essential configuration. The wire harness may also include multiple optional harnesses.

In the example shown in FIG. 9, the wire harness 120 includes a base harness 122, a first optional harness 160A, and a second optional harness 160B. The first optional harness 160A is connected to the third connector 137 of the base harness 122. The second optional harness 160B is connected to the first optional harness 160A. As a result, the plurality of optional devices 19B can be divided into groups, and only the optional harness corresponding to the group of optional devices 19B to be mounted in the vehicle can be mounted in the vehicle. In the example shown in FIG. 9, the plurality of optional devices 19B are divided into two groups, namely first optional devices 19B1 and second optional devices 19B2. The plurality of optional devices 19B may also be divided into three or more groups.

The first optional harness 160A supplies power to the first optional devices 19B1, and the second optional harness 160B supplies power to the second optional devices 19B2. The method of grouping the first optional devices 19B1 and the second optional devices 19B2 is not particularly limited, and can be set as appropriate. For example, the plurality of optional devices 19B may also be divided into first optional devices 19B1 and second optional devices 19B2 depending on the amount of demand or the like. The first optional devices 19B1 are devices that are in high demand among the optional devices 19B, and are assumed to be, for example, a motor for an electric seat, a heater, a ventilator, and the like. The second optional devices 19B2 are devices with low demand among the optional devices 19B, and are assumed to be, for example, a massager, a biological sensor, a speaker, a microphone, a USB port, and the like.

More specifically, the first connector 164 of the first optional harness 160A is connected to the third connector 137 of the base harness 122. The third connector 137 and the first connector 164 are provided with circuits for supplying power to the first optional devices 19B1. The first optional harness 160A is provided with the electric wires 62 and the second connector 65 for the first optional devices 19B1 to be connected to the circuit. The third connector 137 and the first connector 164 are also provided with circuits for supplying power to the second optional devices 19B2. The first optional harness 160A is provided with electric wires 162A and a connector 166 (optional third connector 166) for the second optional harness 160B to be connected to the circuit. The protective member 168 of the first optional harness 160A covers the intermediate portions of the electric wires 62 and 162A. In the first optional harness 160A, the electric wires 62 and 162A are branched inside the protective member 168. The second connector 65 of the first optional harness 160A is connected to the first optional devices 19B1.

The second optional harness 160B has the same configuration as the optional harness 60 described above. The first connector 64 of the second optional harness 160B is connected to the third optional connector 166 of the first optional harness 160A. The second connector 65 of the second optional harness 160B is connected to the second optional devices 19B2. The second optional harness 160B is not provided with a connector to be connected to an optional harness further downstream. When the plurality of optional devices 19B are divided into three or more groups, the second optional harness 160B may also be provided with a connector that is connected to a third optional harness further downstream. In this manner, a plurality of optional harnesses may also be connected in a line in order starting from the upstream harness.

Figure 10:
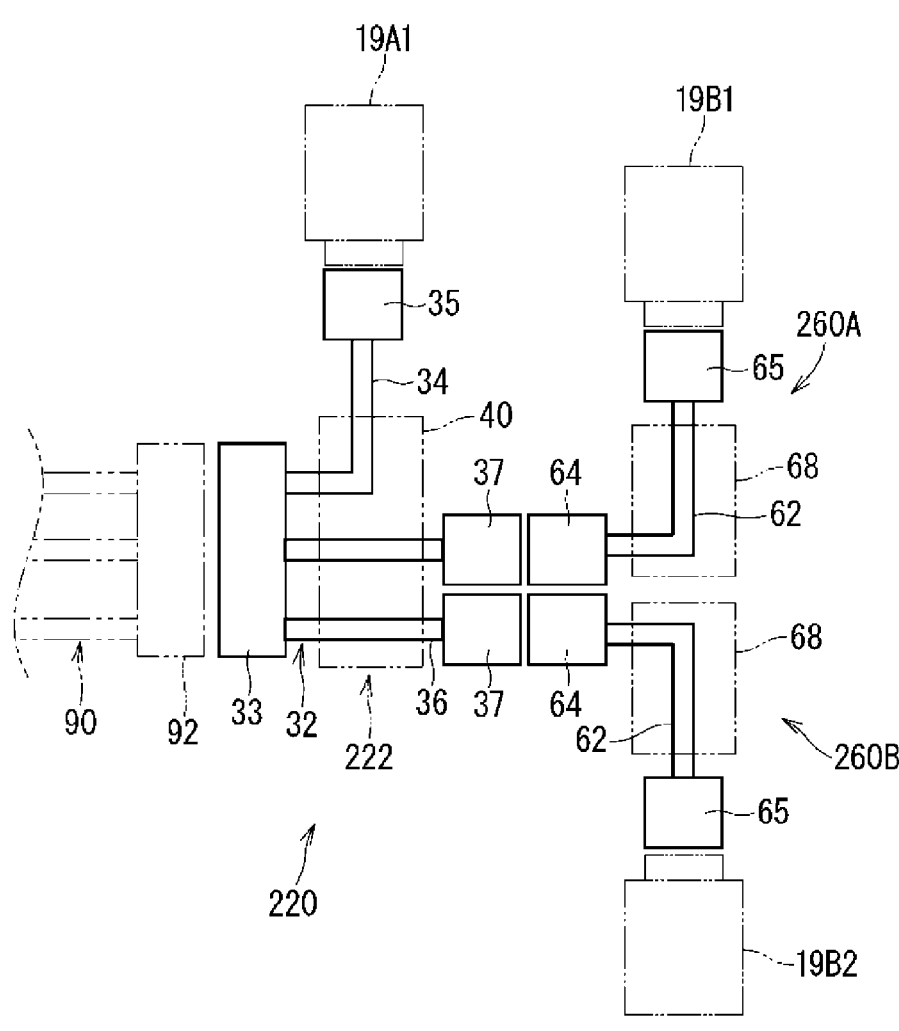
FIG. 10 is a schematic block diagram showing another modified example of the circuit configuration of the wire harness.

FIG. 10 is a block diagram showing another modified example of the circuit configuration of the wire harness 20.

In the example shown in FIG. 10, the wire harness 220 includes a base harness 222 and two optional harnesses 260A and 260B. A third connector 37 for the optional harness 260A and a third connector 37 for the optional harness 260B are separately provided on the base harness 222. The two optional harnesses 260A and 260B have the same configuration as the optional harness 60 described above. A second connector 65 of the optional harness 260A is connected to the first optional device 19B1. A second connector 65 of the optional harness 260B is connected to the second optional device 19B2. In this manner, a plurality of optional harnesses may be connected so as to branch off from the upstream harness.

Figure 11:
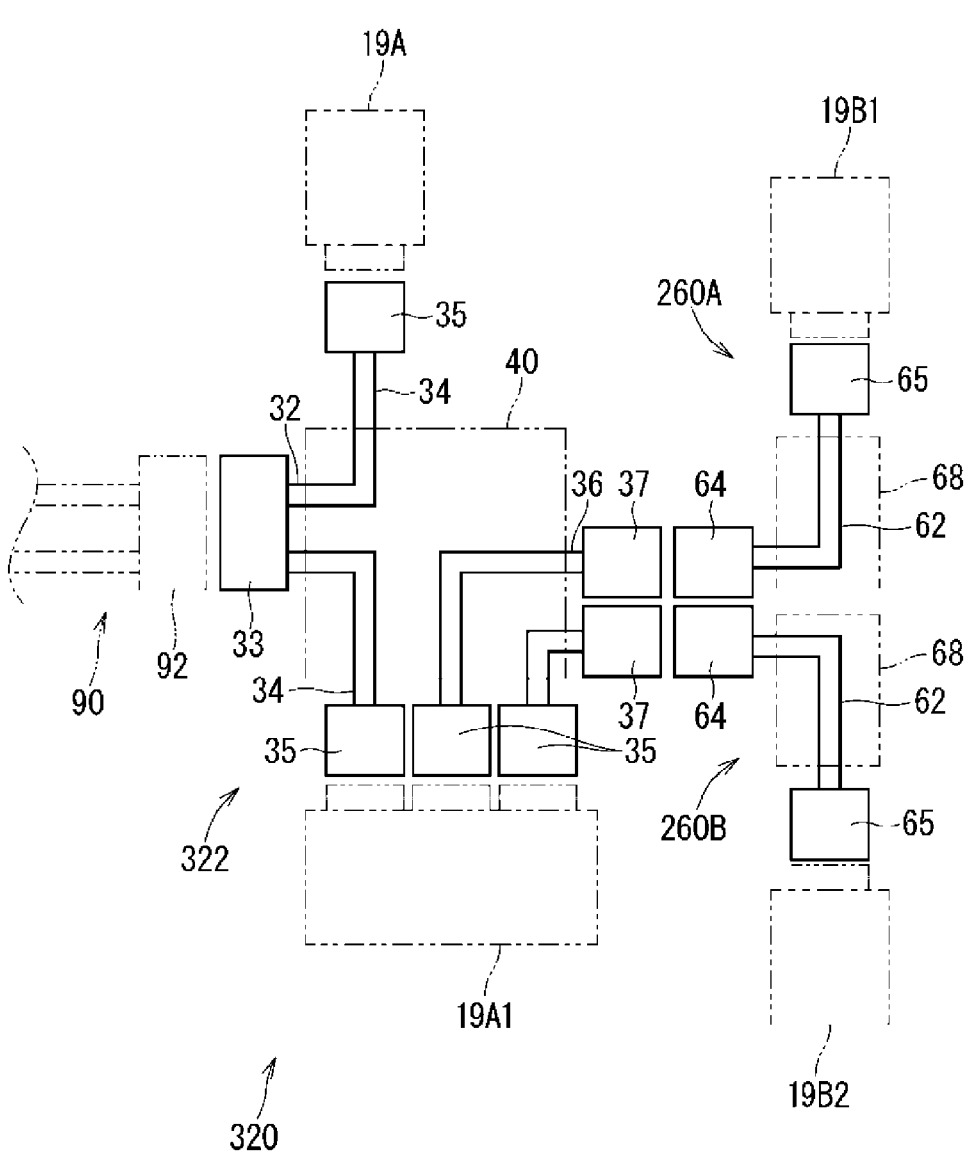
FIG. 11 is a schematic block diagram showing yet another modified example of the circuit configuration of the wire harness.

FIG. 11 is a block diagram showing yet another modified example of the circuit configuration of the wire harness 20.

In the example shown in FIG. 11, the wire harness 320 includes a base harness 322 and two optional harnesses 260A and 260B. Devices 19A1 having a power distribution function are provided as the common devices 19A. The devices 19A1 may be any devices as long as they have a power distribution function, and for example, they may be ECUs. The base harness 322 is provided with electric wires that connect the devices 19A1 and the first connector 33, and electric wires that connect the devices 19A1 and the third connector 37. As a result, power can be distributed in the seat 10, and an increase in the number of electric wires in the partner-side wire harness 90 can be suppressed.

The two optional harnesses 260A and 260B have the same configuration as the optional harness 60 described above. The second connector 65 of the optional harness 260A is connected to the first optional devices 19B1. The second connector 65 of the optional harness 260B is connected to the second optional devices 19B2.

Note that in the example shown in FIG. 11, an example has been described in which the wire harness 220 shown in FIG. 10 is provided with the devices 19A1 having a power distribution function, but the wire harness 120 shown in FIG. 9 may also be provided with the devices 19A1 having a power distribution function.

Figure 12:
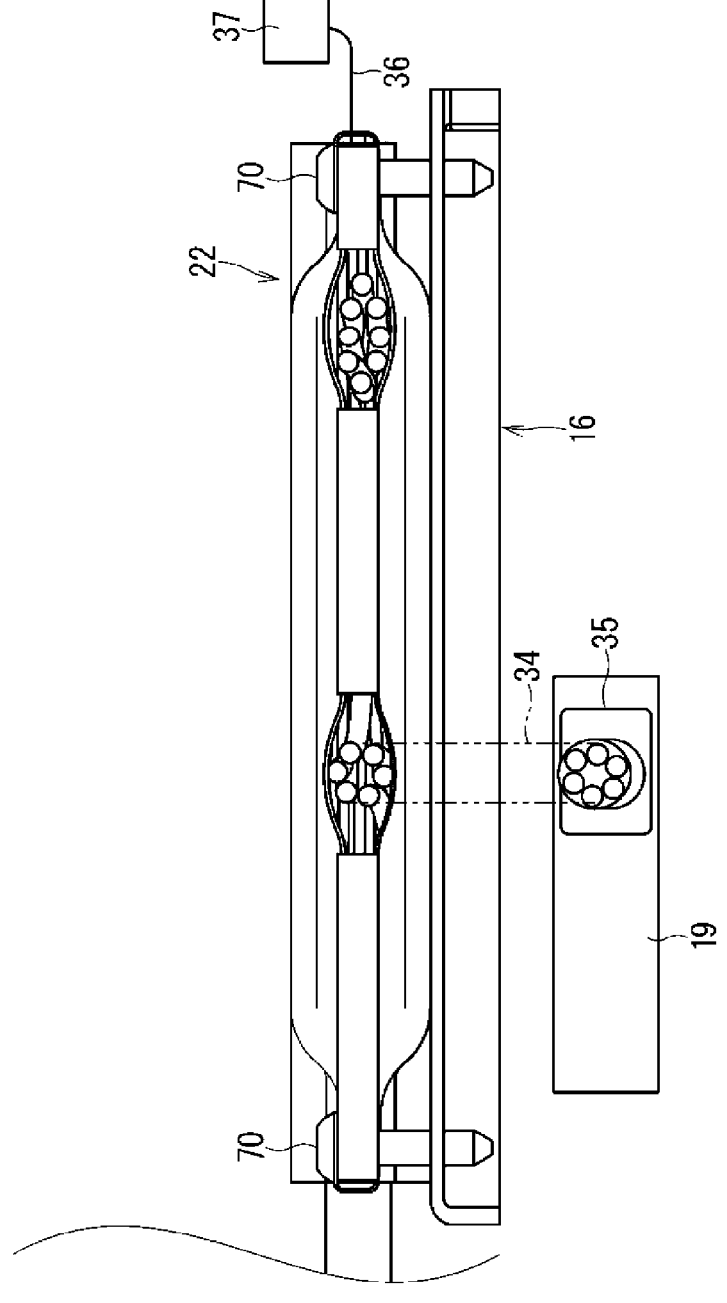
FIG. 12 is an explanatory diagram showing a modified example of a wire harness with a base member.

FIG. 12 is an explanatory diagram showing a modified example of the wire harness 20 with the base member 16.

Although the optional harness 60 has been described thus far as being attached to the seat 10, this is not an essential configuration. If the user does not need the optional devices 19B, the optional harness 60 may be omitted and the base harness 22 may be attached to the seat alone, as shown in FIG. 12. By omitting the optional harness 60 when the optional devices 19B are not mounted, an increase in the weight of the vehicle can be suppressed accordingly. In this case, the base harness 22 is attached to the seat 10 without the third connector 37 being connected.

In addition, although the optional harness 60 has been described thus far as being formed flat, this is not an essential configuration. For example, the optional harness 60 may also be bundled with adhesive tape so as to have a circular cross section. A portion of the optional harness 60 having a circular cross section may be overlaid on the protective member 40.

Also, although the protective member 40 has been described thus far as including the first sheet member 48 and the second sheet member 54, this is not an essential configuration. For example, the protective member may also be constituted by a single sheet member. The electric wires 30 may also be arranged and fixed to one sheet member. The sheet member and the electric wires 30 may be fused together. The same applies to the protective member 68 as well. Note that the protective member 40 may include the first sheet member 48 and the second sheet member 54, and the protective member 68 may be constituted by one sheet member. The electric wires 62 may be sandwiched between the protective member 40 and the protective member 68 made of a single sheet member.

Also, although the first sheet member 48 and the second sheet member 54 have been described thus far as being separate members from each other, this is not an essential configuration. The first sheet member 48 and the second sheet member 54 may be molded so that they are partially connected, and the connected portion may be folded back to form the protective member 40. When the protective member 40 is separated into the first sheet member 48 and the second sheet member 54, a portion of the first sheet member 48 and the second sheet member 54 may be connected without any trace of fusion, adhesion, or the like. For example, the first sheet member 48 and the second sheet member 54 may be connected on the long side of the protective member 40 where no extension port 42 is provided.

Note that the configurations described in each of the above embodiments and modified examples can be appropriately combined as long as they do not contradict each other.

LIST OF REFERENCE NUMERALS

- 10 Seat
- 11 Seat portion
- 12 Backrest portion
- 13 Frame
- 14 Rail
- 15 Slider
- 16 Base member
- 17 Main body portion
- 17a Support surface
- 17h Attachment hole
- 18 Arm portion
- 19 Device
- 19A, 19A1 Common device
- 19B Optional device
- 19B1 First optional device
- 19B2 Second optional device
- 20, 120, 220, 320 Wire harness
- 22, 122, 222, 322 Base harness
- 30 Electric wire
- 32 First branch line
- 33 First connector
- 34 Second branch line
- 35 Second connector
- 36 Third branch line
- 37, 137 Third connector
- 40 Protective member
- 41 Outer edge
- 42 Extension port
- 44 Folded fixing portion
- 46 Through hole
- 48, 48S First sheet member
- 49 First main body portion
- 50 First protruding portion
- 51 Fold
- 52, 53 First through hole
- 54, 54S Second sheet member
- 55 Second main body portion
- 56 Second through hole
- 60, 260A, 260B Optional harness
- 160A First optional harness
- 160B Second optional harness
- 62, 162A Optional electric wire
- 63 Optional branch line
- 64, 164 Optional first connector
- 65 Optional second connector
- 166 Optional third connector
- 68, 168 Optional protective member

70 Pin
80 Jig
90 Partner-side wire harness
92 Partner-side connector

What is claimed is:

1. A wire harness to be attached to a seat of a vehicle, the wire harness comprising:
a base harness including a plurality of electric wires and a protective member covering intermediate portions of the plurality of electric wires,
wherein the plurality of electric wires branch into three or more branch lines inside the protective member, and are kept flat by the protective member,
the three or more branch lines include a first branch line provided with a first connector for receiving power supply from an upstream side, a second branch line provided with a second connector for supplying power received by the first connector to a device provided in the seat, and a third branch line provided with a third connector for supplying power received by the first connector to an optional device provided in the seat,
wherein the wire harness further comprises an optional harness for the optional device, and
wherein an intermediate portion of the optional harness overlaps the protective member and a connector at an end of the optional harness is connected to the third connector.

2. The wire harness according to claim 1,
wherein the intermediate portion of the optional harness is formed flat by an optional protective member, and
the protective member and the optional protective member overlap with each other.

3. The wire harness according to claim 2,
wherein a plurality of through holes for fixing to a base member are formed in the protective member,
a plurality of optional through holes for fixing to the base member are formed in the optional protective member, and
positions of the plurality of through holes and positions of the plurality of optional through holes are aligned with each other.

4. The wire harness according to claim 1,
wherein the optional harness includes a first optional harness to be connected to the third connector and a second optional harness to be connected to the first optional harness.

5. A wire harness with a base member, comprising:
the wire harness according to claim 1; and
a base member to be attached to the seat,
wherein the protective member is attached to the base member.

6. A wire harness to be attached to a seat of a vehicle, comprising a base harness including a plurality of electric wires and a protective member covering intermediate portions of the plurality of electric wires; and
an optional harness for an optional device,
wherein the plurality of electric wires branch into three or more branch lines inside the protective member, and are kept flat by the protective member,
the three or more branch lines include a first branch line provided with a first connector for receiving power supply from an upstream side, a second branch line provided with a second connector for supplying power received by the first connector to a device provided in the seat, and a third branch line provided with a third connector for supplying power received by the first connector to the optional device provided in the seat,
a plurality of through holes for fixing to a base member are formed in the protective member,
a plurality of optional through holes for fixing to the base member are formed in an optional protective member, and
positions of the plurality of through holes and positions of the plurality of optional through holes are aligned with each other.

7. The wire harness according to claim 6,
wherein an intermediate portion of the optional harness overlaps the protective member and a connector at an end of the optional harness is connected to the third connector.

8. The wire harness according to claim 7,
wherein the intermediate portion of the optional harness is formed flat by an optional protective member, and
the protective member and the optional protective member overlap with each other.

9. The wire harness according to claim 6,
wherein the optional harness includes a first optional harness to be connected to the third connector and a second optional harness to be connected to the first optional harness.

10. The wire harness according to claim 6,
wherein a plurality of through holes for fixing to a base member are formed in the protective member.

11. The wire harness according to claim 6,
wherein the protective member is formed of a resin material having a higher rigidity than insulation coatings of the plurality of electric wires.

12. The wire harness according to claim 6,
wherein the wire harness comprises a first optional harness connected to the third connector and a second optional harness connected to the first optional harness such that the first and second optional harnesses are cascade-connected and power from the first connector is supplied to the first and second optional harnesses through the cascade connection.

* * * * *